United States Patent [19]
Malon et al.

[11] 3,808,427
[45] Apr. 30, 1974

[54] SYSTEMS FOR CONTROLLING THE SPEED OF AN AUTOMOTIVE VEHICLE, ESPECIALLY OF A TRAIN

[76] Inventors: Jean-Pierre Malon, 32, Damaine de Chateau Saillaul-94, Maisons Alfort; Joseph Andre Loreau, 49, rue Marcel Bourbarias 94, Alfortville, both of France

[22] Filed: May 13, 1971

[21] Appl. No.: 143,163

[30] Foreign Application Priority Data
May 13, 1970 France.............................. 70.17500
May 13, 1970 France.............................. 70.17501

[52] U.S. Cl. .......................... 246/63 R, 246/182 C
[51] Int. Cl................................................ B61l 1/10
[58] Field of Search ........ 246/187 R, 182 C, 182 R, 246/63 C, 63 R

[56] References Cited
UNITED STATES PATENTS
3,643,090  2/1972  Malon ........................ 246/187 B X
3,270,199  8/1966  Smith............................. 246/182 C

FOREIGN PATENTS OR APPLICATIONS
1,579,467  8/1969  France ............................ 246/187 B Primary Examiner—Gerald M. Forlenza
Assistant Examiner—George H. Libman
Attorney, Agent, or Firm—Dechert, Price & Rhoads

[57] ABSTRACT

The invention relates to an automotive driving system for a vehicle including means producing space signals each time it has travelled a section of its path, the length of which is porportional to the desired speed set at the level of this section by a predetermined program, control means operative by said space signals to apply braking or traction orders to the braking and traction equipments of the vehicle, depending on whether the vehicle travels the successive sections of its path within time intervals smaller or greater than a given base time.

The safety means include a generator producing a saw teeth signal whose ramps are brought back to zero by said space signals and means substituting an emergency braking order for the orders from said control means to the above equipments as soon as the maximum magnitude of said ramps falls below a threshold related to said base time.

10 Claims, 9 Drawing Figures

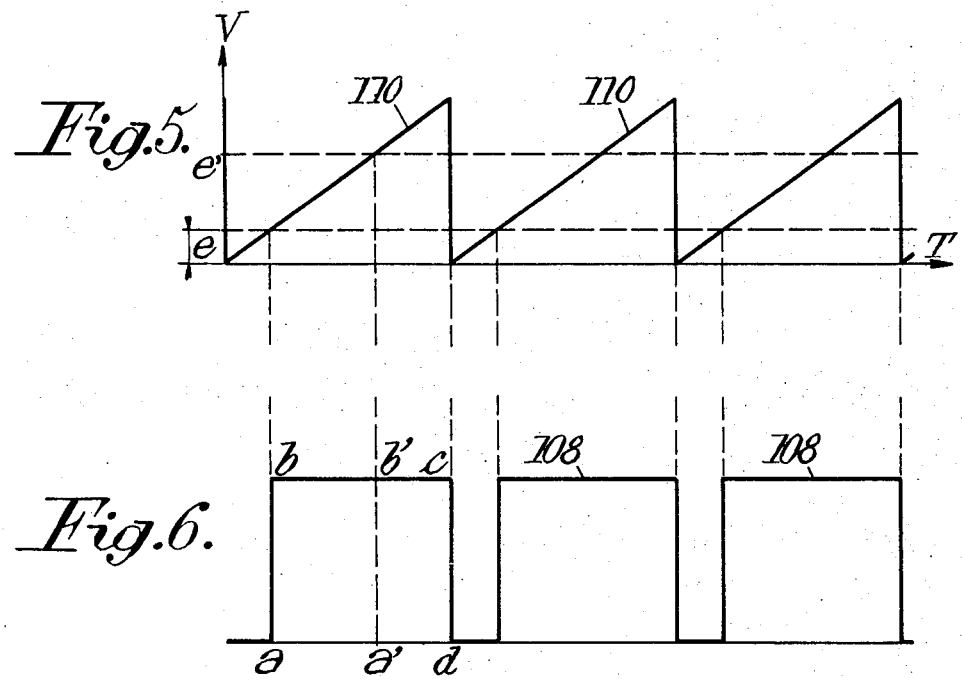
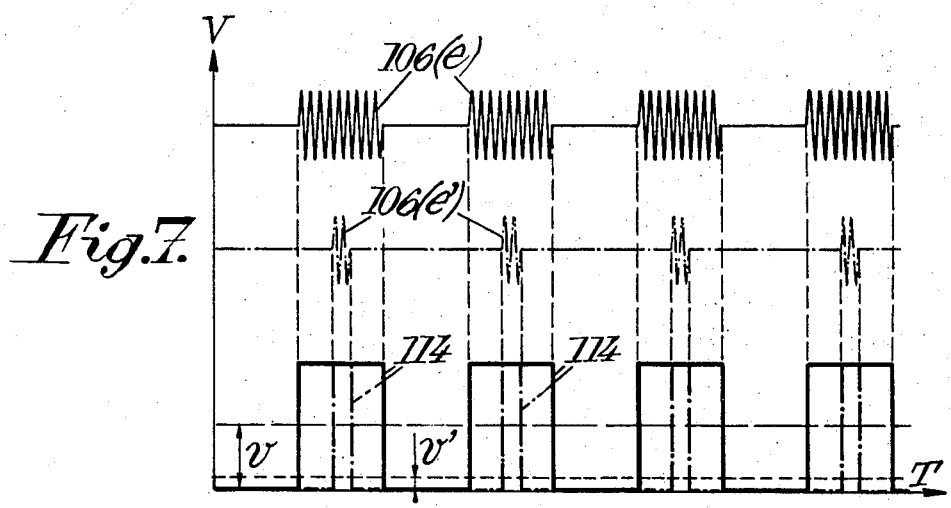

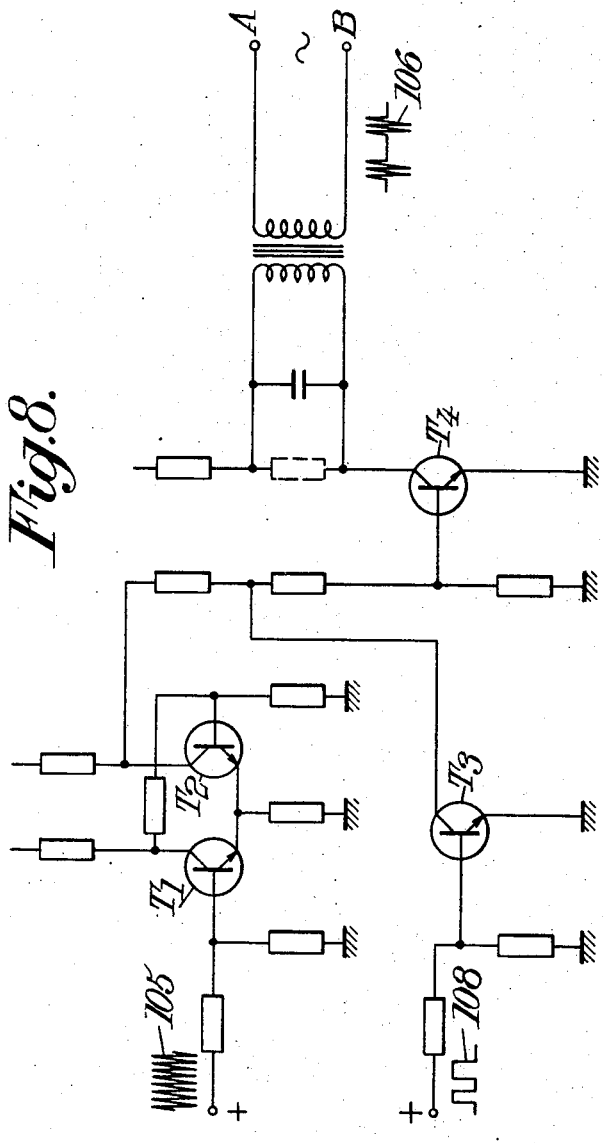

SYSTEMS FOR CONTROLLING THE SPEED OF AN AUTOMOTIVE VEHICLE, ESPECIALLY OF A TRAIN

The invention relates to a system, for controlling the speed of an automotive vehicle, especially of a train, able to cause its speed to follow a pre-determined program of operation, which system comprises means for supplying to the vehicle a space information or signal at the end of each of a series of successive intervals of space whose length is proportional to the desired speed provided for by the program in the corresponding part of the path followed by the vehicle, and control means operative by said space signals to apply traction or braking orders to the traction or braking equipment, depending upon whether the time taken by the vehicle to travel each of the successive intervals is either greater or, in the contrary, lower than a given base time.

Such a system is disclosed, for instance, in the U.S. Pat. No. 3,643,090 of J. P. Malon wherein means for supplying to a train the said space signals comprise a piloting cable travelled by an electric current and so disposed along the track that it induces in receivers carried by the train and permanently exposed to the field produced by said electric current, a variation of the field each time the train has travelled one of said successive intervals of space, these successive field variations being then transformed into electric signals exploited by the said control means.

These control means need be of a great accurary in order to perform an appropriate slaving of the effective speeds of the vehicle to the desired speeds set by the above said program. In the known systems the said control means need also to be capable of performing an additional function, that is a function of safety with respect to over-speeds, thus to control a safety braking if, in particular, the effective speed of the vehicle exceeds in some portions of its path a given value or, in the systems of the type concerned, if the vehicle travels each of the successive sections of its path within periods of time which are lower than a pre-set time. This safety function is likely to involve a rather important complexity of the control means, especially if the system, like the one disclosed in the above patent, is contrived such as to permit the modification of the program of operation, namely by changing the above said base time. It will be recalled that in the last mentioned system, the base time is dependent upon the adjustable frequency of a periodic reference signal, which for instance is formed by the periodic current passing through the piloting cable.

The object of the invention is to eliminate to a large extent the disadvantages of the known systems, especially to provide an automatic driving system including safety means and exhibiting a reduced complexity together with a great flexibility in use.

The automatic driving system according to the invention, comprises
  means for supplying to the vehicle a space signals each time it has travelled a section of its path whose length is proportional to the speed desired for the vehicle at the corresponding location of said path,
  control means operative by said space signals adapted to supply braking or traction orders to the braking and traction equipments of the vehicle to slow the speed thereof to a given program
  generator means also controlled by said space signals adapted to supply at tne end of the travel by the vehicle of each of the successive sections of its path, a signal whose magnitude is a function of the time taken by the vehicle to travel said section and
  safety means supplied with said last mentioned signal and adapted to substitute an emergency slowing down or braking order for the normal traction or braking orders supplied to the braking and traction equipment by said control means, responsive to the falling of the maximum amplitude of said variable signal below a threshold value dependent upon the base time set by the program at the level of the corresponding sections.

In accordance with a preferred embodiment of the invention, the above said generator is adapted to supply signals in the form of saw teeth which vary linearly as a function of time and which are brought back to zero by the said space signals and the said safety means comprise an electronic comparator mounted as a substractor at a first entry of which is applied a signal whose magnitude corresponds to the above said threshold value and at the second entry of which is applied the said saw teeth signal, whereby the substractor delivers no output signal when the speed of the vehicle exceeds the maximum speed set by the program at the level of the corresponding section, the absence of the output signal being used for substituting an emergency braking order for the normal traction or braking orders normally applied to the vehicle by the said control means.

Still in a further preferred embodiment of the invention, the braking and traction orders are applied by the normal control means to the braking, and traction equipments through a carrier of appropriate frequency, said carrier being modulated by these braking or traction orders as a function of their intensities, whereby the oscillator which produces said carrier is adapted to be set out of operation responsive to the absence of an output signal from the above said electronic comparator. If the braking equipment comprises electrovalves of the type disclosed in U.S. Pat. No. 3,682,512, which are adapted to produce an order of maximum braking when they are not supplied with electric current, it will be appreciated that a safety braking order will be substituted for the normal braking orders applied to the braking equipments by the normal control means, as long as the oscillator will be kept out of operation, i.e., as long as no output signal is produced by the said electronic comparator. The subordination of the braking equipment to the normal control means is then immediately restored as soon as a periodic signal is again obtained at the output of the electronic comparator, after the overcoming of the overspeed under the action of the emergency braking.

Other features of the invention will appear in the course of the following additional disclosure of a preferred embodiment of the invention in connection with the drawings in which:

FIGS. 5 and 6 are diagrams showing the variations of voltage at the outputs of other elements of this installation;

FIG. 7 is another diagramatic view illustrating the modulation of the carrier and the extraction of the average value;

FIG. 8 is a diagram of an embodiment of the system for modulating the carrier;

It is assumed that the above installation is carried by a train. This installation comprises means, adapted to supply at any time to an electronic comparator a threshold signal whose magnitude is dependent upon the minimum time of travel by the train of the successive sections of its path, on the one hand, and a signal linearly variable forming a ramp whch is brought back to zero at the end of the travel by the train of each section of its path (said signal thus exhibiting a saw teeth form), on the other hand. These means are arranged such that signals are periodically produced at the output of the electronic comparator if the successive maximum magnitudes of the ramps of the saw teeth signals exceed the magnitude of the threshold signal. The periodically produced output signals, more particularly their disparition in the case of an overspeed, control the means, such as disclosed hereafter, for applying a safety braking or slowing down order to the braking equipments of the train.

The setting back to zero of the ramps of the saw teeth signal is operated at the end of the travel by the train of each of the successive sections of its path, this being achieved, for instance in the case of an installation of the type disclosed in U.S. Pat. No. 3,643,090, by the signals produced on board of the train at the level of the extremities of the successive sections of a piloting cable. These signals could however also be produced, for instance, by a generator driven by one of the wheels of the train each time it has undergone one or several revolutions.

Figure 2:
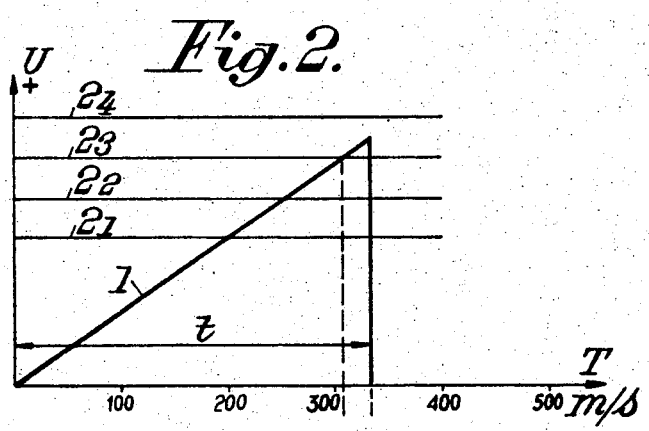
FIGS. 2 and 3 are two diagrams showing the variations of the voltage at the outputs of certain parts of this installation.

The variations of the threshold signal and of the ramp signals in function of time are illustrated in FIG. 2 wherein tensions U are plotted on the axis of ordinates and the times T on the axis of abscissae.

Figure 3:
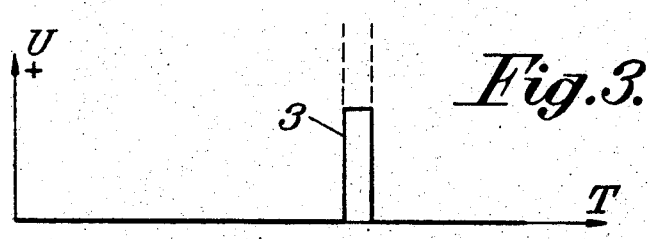

The reference number 1 refers to the ramp of a tooth of the saw teeth signal produced during the travel by the train of a corresponding section of its path, in the instant example, within a time $t$ of 320 ms. The reference numeral $2_1, 2_2, 2_3$ refer to several levels of continuous threshold signals corresponding to different maximum speeds which are likely to be pre-set by a program. It will thus be appreciated that for these three pre-set maximum speeds, the ramp signal intersect the corresponding threshold signals and that accordingly a signal, such as shown in FIG. 3 in connection with the $2_3$ signal, will be obtained at the exit of the electronic comparator.

In the contrary, no intersection of the ramp signal with the threshold signal will be obtained, if the threshold signal has been set to the $2_4$ level shown in FIG. 2, this meaning that the effective speed of the train on the corresponding section exceeds the maximum speed authorized by the program. No signal is then produced at the output of the electronic comparator, the absence of signal being then transformed into an emergency braking order.

Figure 1:
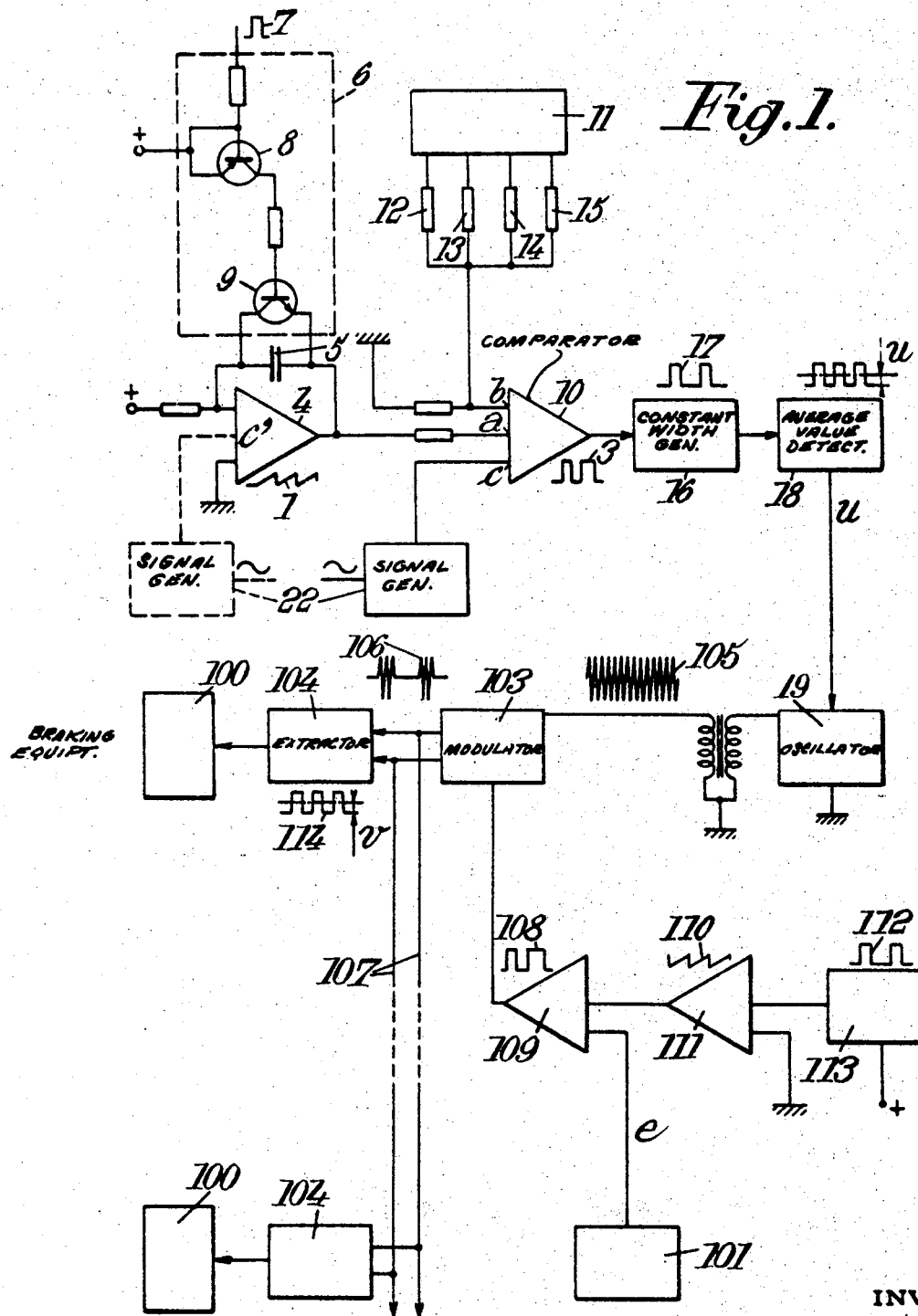
FIG. 1 is a diagramatic view of this preferred embodiment.

FIG. 1 shows diagramatically the different essential parts of an installation which can operate according to the principle disclosed hereabove.

The generator producing the teeth signal whose ramps are set back to zero by the space information signals received by the train each time it has travelled a complete section of its path, comprises for instance a linear amplifier or integrator 4 cooperating with a capacitor 5 combined with a set back to zero system operative by the said space information signals 7 and which comprises, for instance, two transistors 8 and 9.

The saw teeth signal 1 produced by the amplifier 4 is applied to a comparator 10 which is for instance of the variable threshold trigger type. The saw teeth signal 1, on the one hand, and a threshold signal are applied on entries $a$ and $b$ respectively of the comparator. The threshold signal is one of a series of the different threshold signals which may be selected by a programing system 11 such as disclosed for instance in the two above U.S. patents, and which are respectively dependent upon the different orders which are normally applicable to the braking and traction equipments of the train. The reference numerals 12 to 15 on FIG. 1 refer, for instance, to polarization resistors adapted to adjust the voltages of the different threshold signals. Resistor 12 sets the threshold value in correspondence with the durations set by the program of the travel by the train of the successive sections of its path, when neither braking orders nor traction orders are to be applied to its braking and traction equipment. Resistors 13 and 14 adjust the threshold signals to values in correspondence with two different braking conditions; resistor 15 adjust the threshold value in correspondence with the traction condition, etc.

An output signal of variable width is thus obtained at the output of said comparator 10, when no overspeed is detected. This signal is then transformed into a system 16 which yields, as shown under 17, signals having constant width. Said system includes for instance essentially a Schmidt trigger followed by a monostable multivibrator as shown in diagram of FIG. 4, referred to again later on.

These signals 17 are then applied in turn to a transistorized electronic system 18 of any known type for extracting the average value. The latter system thus finally produces a direct voltage as long as no overspeed occurs. The disappearance of this direct voltage $u$ controls the emergency braking, for instance, as disclosed hereafter.

The braking equipments of the train include braking electrovalves 100 of the type disclosed in the above mentioned U.S. Pat. No. 3,682,512, which are adapted to control a maximum braking when they are not supplied with any electric signal at their entries and, when such signals are applied, to cause a more or less important release of the braking effort on the wheels of the train dependent upon the value of the said signal, especially of its voltage.

In a preferred embodiment of the invention, recourse is had, for transmitting the braking orders to the braking equipments 100 of the train, to a width modulation, of a carrier 105, for instance, of 20 kHz, in a modulator 103, which carrier 105 is produced by an oscillator 19 by the tensions $e$ applied by the control means 101 (FIG. 1) to the braking and traction equipments of the train, the modulated waves 106 obtained being then transformed into square pulses, of which a variable average voltage is extracted in an extractor 104 and applied to the braking electrovalves 100 of the train braking equipment.

This system can be seen in FIG. 1. The original carrier waves 105 is transformed in the modulator 103 into a modulated wave 106 which is sent over a pair of conductors 107 to the different breaking electrovalves 100 of the vehicle.

If the oscillator 19 is able to produce the carrier 105 only when the direct voltage $u$ formed by the above disclosed system 18 is applied to it, it will be appreciated that an emergency breaking order will be substituted for the braking orders normally applied by the control means 101 as soon as the carrier is suppressed, responsive to the suppression of the direct voltage $u$ at the output of the system 18.

As concerns the modulation, the modulation in width is preferred though other types of modulations can be contemplated, for instance a modulation in amplitude.

The modulator 103 is supplied with a series of rectangular pulses 108 whose width varies as a function of the voltage $e$ applied by the control means 101.

These rectangular pulses are obtained at the output of an electronic comparator 109 receiving on its entries the voltage $e$, on the one hand, and a signal in the form of saw teeth 110 which is produced by a generator 111 supplied itself by the pulses 112 produced by a multivibrator 113.

Provided that the rythm of the saw teeth variable voltage is appropriately chosen with respect to the range of variations of the control voltage $e$, the comparator so established operates as disclosed herebelow in connection with FIGS. 5 and 6, with the voltages V plotted on the axis of ordinates and the times T on the axis of abscissae.

The voltage $e$ imparts to the comparator 109 a variable threshold level. The lower voltages $e$ (which cause the smaller releases of the braking effort on the train) cause the production at the output of the said comparator of rectangular signals $a, b, c, d$, whose width is relatively important as a result of the interaction between the threshold level and the ramps of the saw teeth signal. The stronger voltages $e'$ (as shown by the broken line $e'$ of FIG. 5) cause the production of rectangular signals $a', b', c, d$ of narrower width.

These rectangular signals 108 of variable width are applied to the modulator 103 for the modulation of the carrier 106 in width.

The treatment of the modulated wave 106, in the extractor 104, comprises first extracting square pulses 114 whose width is in correspondence with the remaining portions of the carrier and then extracting the average value $v$ of these square pulses. The average magnitude of this average value $(v,v')$ accordingly the degree of release of the braking effort controlled by the electrovalves 100, vary as a function of the voltages $e, e'$.

Conventional circuits may be used for the modulator 103 and the extractor 104. Such circuits are represented by way of example in FIGS. 8 and 9.

The modulator circuit of FIG. 8 comprises a Schmidt trigger comprising two transistors $T_1$ and $T_2$ and fed with the carrier 105 to be modulated, on the one hand, and a transistor $T_3$ supplied with the modulation signal 108 for applying it at the output of the trigger, said transistor $T_3$ being combined with a fourth transistor $T_4$; the modulated carrier 106 is obtained at the terminals A, B.

The trigger produces square pulses the same frequency than the carrier 105; the output is grounded through transistor $R_3$ when the signal 108 has a positive voltage value; in such instance, no signal is applied to the base of the transistor $T_4$; in the contrary, when the signal 108 is at a "zero" level, the signal produced at the output of the trigger is applied to the base of transistor $T_4$ which then produces a signal modulated in width between the terminals A, B.

Figure 9:
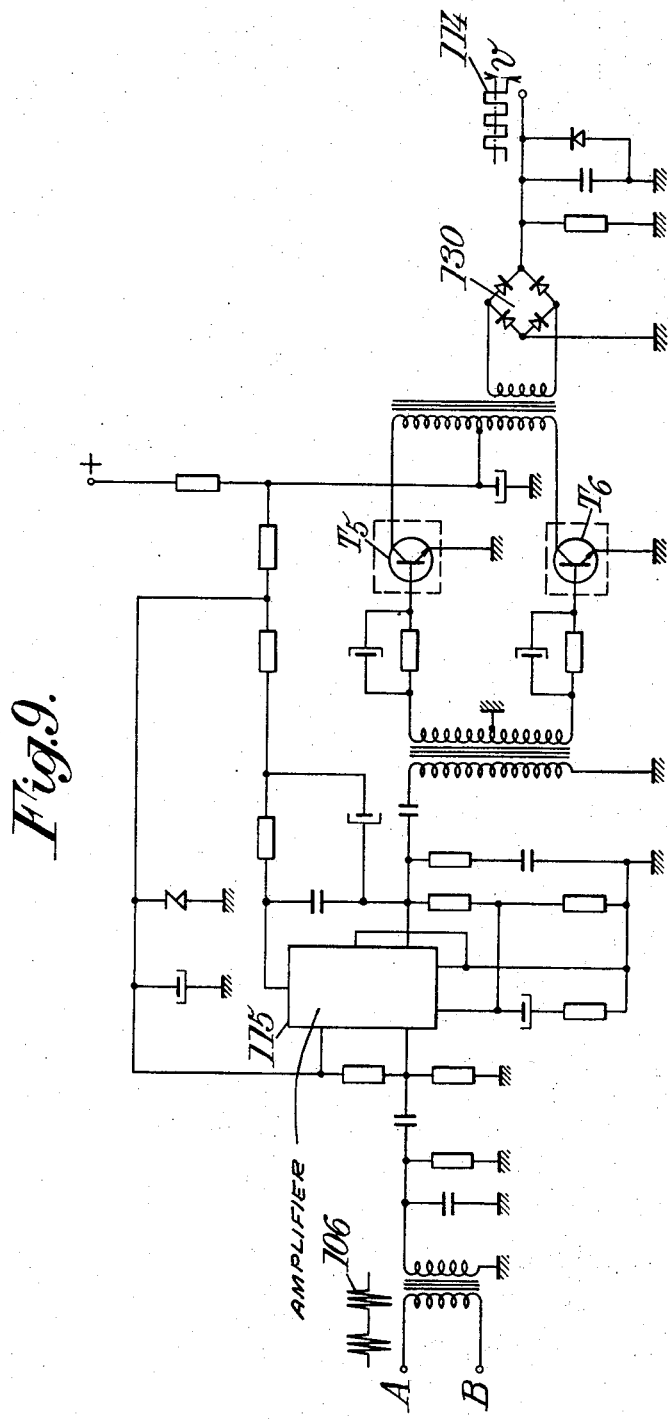
FIG. 9 is a diagram of a system for extracting the average value.

The circuit of the extractor system 104 is shown in FIG. 9. The modulated carrier 106 is applied to an amplifier 115, then to a system comprising two transistors $T_5$ $T_6$ mounted in opposition and, finally, to a rectifier bridge 130. The output of signal of the amplifier is applied to a convertor comprising the two transistors $T_5$, $T_6$ and two transformers, especially an input transformer and an output transformer, the purpose of this convertor being to provide a signal sufficiently powerful to control, after it has been rectified, the electrovalves of the braking equipment.

There is thus obtained a system whose operation is simple and in which the safety means which are distinct from the normal control means for the braking and traction equipments, are adapted to act only temporarily, as long as required by the security conditions, without interfering with the said control means whose action on the braking and traction equipments is immediately restored as soon as the safety means have overcome the temporary overspeed.

The system according to the invention may be further provided with means to modify the program as defined by the above mentioned threshold level, these means being able to cause the comparator 10 or the integrator 4 cooperating with said comparator (FIG. 1) to be able to respond to an additional parameter.

If use is made for setting the variable base time of travel by the vehicle of the successive sections of its path, of a piloting system as disclosed in U.S. Pat. No. 3,643,090, wherein the said base times are dependent upon the frequencies of a reference signal, the comparator 10 is associated to a system 22 (FIG. 1) adapted to produce a voltage dependent upon said variable frequency, which voltage is applied to an entry $c$ of the comparator.

Figure 4:
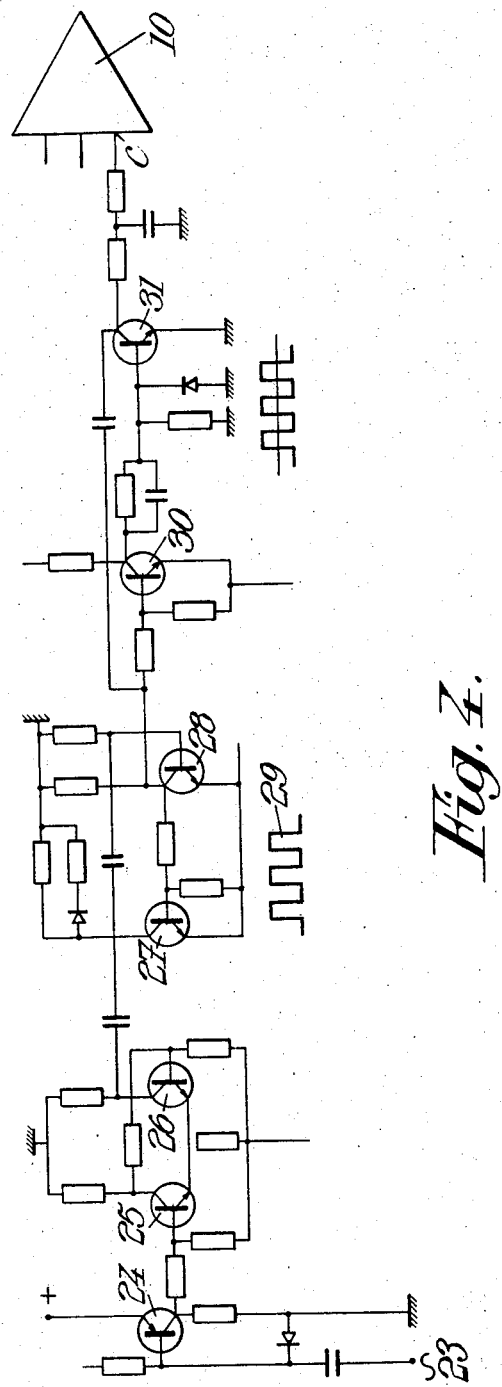
FIG. 4 is a diagramatic view of different electronic circuits used in the installation.

The system 22 for converting a frequency into a voltage may be of any known type, for instance, be of the type shown in FIG. 4. Such a system, which receives the signal of variable frequency at its output 23 comprises a transistor 24 adapted to shape this signal, a Schmidt trigger 25, 26, a monostable 27, 28 providing signals having a constant width 29 and, finally, a system 30, 31 for counting the average value of the pulses obtained and to provide a voltage proportional to the frequency.

If applied to the entry $c$ of the comparator 10, this voltage modifies the ordinate of the threshold values 2 (FIG. 2) with respect to the ramp 1.

If applied on an entry $c'$ of the integrator 4 (FIG. 1) the voltage modifies the form of ramp 1, with respect to the threshold level 2.

There is obtained a system whose operation is apparent from the foregoing disclosure. It should be noted that the system according to the invention comprises the additional advantage of simplicity, especially as concerns the safety means which, contrarywise to the normal control means, need not be of a great accuracy.

What is claimed is:

1. An automatic driving system for a vehicle including vehicle speed control equipment, said system comprising:

means for supplying to the vehicle a space signal each time it has travelled a section of its path whose length is proportional to the speed desired for the vehicle at a corresponding location of said path, control means operative by said space signal adapted to supply speed control orders depending on whether it travels said sections in time intervals smaller or greater than a given pre-set base time, generator means also controlled by said space signals adapted to supply, at the end of the travel by the vehicle of each of the successive sections of its path, a signal whose magnitude is a function of the time taken by the vehicle to travel said section;

transmitter means normally operative for transmitting said speed control order to said speed control equipment, the latter being adapted to cause a maximum braking when said transmitter means are not operative; and safety means supplied with the signal from said generator means and adapted to render said transmitter means inoperative, responsive to the falling of the maximum amplitude of said variable signal below a threshold value dependent upon said base time.

2. System according to claim 1, wherein said generator produces signals in the form of saw teeth which vary linearly as a function of time and which are brought back to zero by said space signals.

3. System according to claim 1, wherein said safety means comprise an electronic comparator mounted as a substractor at a first entry of which is applied a signal whose magnitude is representative of said threshold value and at a second entry of which is applied the said variable signal, said electronic comparator being adapted to control a safety braking upon the falling of the maximum magnitude of said variable signal to a value lower than the value of said threshold signal.

4. System according to claim 3, wherein said electronic comparator periodically produces an output signal as long as the maximum magnitudes of the variable signals exceed the value of the threshold signal.

5. System according to claim 4, wherein the braking equipment comprises electrovalves adapted to cause a maximum braking responsive to the absence of any signal at their entries, said system further comprising means operative by the signals periodically produced at the output of said comparator, for conveying the braking orders from said control means to said electrovalves.

6. System according to claim 4, which comprises means for setting different voltages respectively representative of different threshold values in turn dependent upon the different base times controlling the production by said control means of the different available traction or braking orders.

7. System according to claim 6, wherein the braking equipment includes electrovalves adapted to cause a maximum braking when no signal is applied to their entries, and which comprises means for conveying the voltages representative of the braking orders from the said control means to the said electrovalves, including an oscillator producing, responsive to the signals produced periodically at the output of said comparator, a carrier, means supplied with said voltages and adapted to modulate said carrier as a function of the magnitude of said voltages and means to extract the average value of the modulated wave produced by said last mentioned means and to apply them to the entries of said electrovalves.

8. System according to claim 7, which comprises means for transforming the output signals from said comparator into a direct voltage, said oscillator being adapted to produce said carrier only if said direct tension is applied to it.

9. System according to claim 1, which further comprises means to modify said base times in relationship to the values of the frequencies of a periodic reference signal and means to apply voltage values to said comparator for correcting said threshold signal as a function of the frequency of said periodic reference signal.

10. A system according to claim 1, which further comprises means to modify said base times in relationship to the values of the frequencies of a periodic reference signal, and means operative on said generator to modify the characteristics of said variable signal as a function of the frequency of said periodic reference signal.

* * * * *